(12) United States Patent
Jhingan

(10) Patent No.: US 7,586,901 B2
(45) Date of Patent: Sep. 8, 2009

(54) DATA INSTANCE ROUTING WITH CONFIGURABLE USER PROFILE

(75) Inventor: Nitin Jhingan, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 1174 days.

(21) Appl. No.: 10/687,717

(22) Filed: Oct. 17, 2003

(65) Prior Publication Data

US 2005/0086372 A1    Apr. 21, 2005

(51) Int. Cl.
*H04L 12/66* (2006.01)
(52) U.S. Cl. .............. 370/352; 709/105; 709/241; 709/243; 709/245
(58) Field of Classification Search .............. 709/105, 709/241, 243, 245; 370/352
See application file for complete search history.

(56) References Cited

U.S. PATENT DOCUMENTS

| | | | |
|---|---|---|---|
| 6,282,281 B1 * | 8/2001 | Low .................. | 379/230 |
| 6,304,913 B1 | 10/2001 | Rune | |
| 6,317,775 B1 | 11/2001 | Coile et al. | |
| 6,578,066 B1 | 6/2003 | Logan et al. | |
| 2003/0080996 A1 * | 5/2003 | Lavin et al. .......... | 345/738 |
| 2003/0145106 A1 * | 7/2003 | Brown .................. | 709/238 |
| 2004/0017798 A1 | 1/2004 | Hurtta et al. | |

FOREIGN PATENT DOCUMENTS

CN      1430840 A    7/2003

* cited by examiner

*Primary Examiner*—Quynh H Nguyen
(74) *Attorney, Agent, or Firm*—Scully, Scott, Murphy & Presser, P.C.; Carl Lanuti

(57) ABSTRACT

Disclosed are a method and system for establishing a session, via the Internet, between a user and an application. The method comprises the steps of providing a plurality of instances of the application, each of the instances having a respective Internet address; and the user accessing one of said instances, via the Internet, by means of the Internet address of said one instance. That accessed one instance selects one of the instances, according to a defined procedure, for a session with the user, and sends to the user an identifier, such as an URL, for accessing said selected one instance. The user accesses the selected one instance, via the Internet, by using said identifier.

12 Claims, 2 Drawing Sheets

DATA INSTANCE ROUTING WITH CONFIGURABLE USER PROFILE

BACKGROUND OF THE INVENTION

1. Field of the Invention

This invention generally relates to data instance routing. More specifically, the invention relates to a method and system for routing users to one of a group of application instances, available via the Internet on different servers, based on configurable user profiles.

2. Background Art

Businesses are using the Internet more and more. An ever increasing number of applications are being made available, via the Internet, at Web sites, and these applications are being used by a continuously increasing number of people. This presents important new opportunities and challenges for businesses and Web site operators.

One challenge is to provide a user with appropriate information, which may vary significantly from user to user. For example, the specific information that a user may need or should be provided with may depend on the geographic location of the user. A user in Europe may want to see prices in Euro Dollars, while a user in Japan may want to see prices in Yen. Other information, such as product availability and delivery times, may also be highly dependent on the physical location of the user.

Another challenge is that many applications, particularly those that are continuously used to receive, process and deliver information twenty-four hours a day, seven days a seek, are "mission critical." It is essential that these applications, and the Web sites that provide them, be continuously accessible for extended periods of time. Other challenges include ensuring that the applications respond in a timely fashion and that the user sessions be handled effectively.

SUMMARY OF THE INVENTION

An object of this invention is to provide an improved method and system for routing users to an Internet application.

Another object of the invention is to route users to one of a number of application instances, available over the Internet on different servers, depending on configurable user profiles.

A further object of the present invention is to use one Internet application instance, on one Web server, to route users automatically to one of a group of applications instances, which provide different information to the user, depending on the information needs of the user.

These and other objectives are attained with a method and system for establishing a session, via the Internet, between a user and an application. The method comprises the steps of providing a plurality of instances of the application, each of the instances having a respective Internet address; and the user accessing one of said instances, via the Internet, by means of the Internet address of said one instance. That accessed one instance selects one of the instances, according to a defined procedure, for a session with the user, and sends to the user an identifier, such as an URL, for accessing said selected one instance. The user accesses the selected one instance, via the Internet, by using said identifier.

With the preferred arrangement of the invention, described in detail below, the user is provided with one common URL for the application, and then the application decides where to route the user. A main advantage is to allow the application to do workload management and also to enforce security rules. For example, the application may be a corporate requisition application, and the application itself may be used to ensure that a user in one instance cannot shop and order items in another instance.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
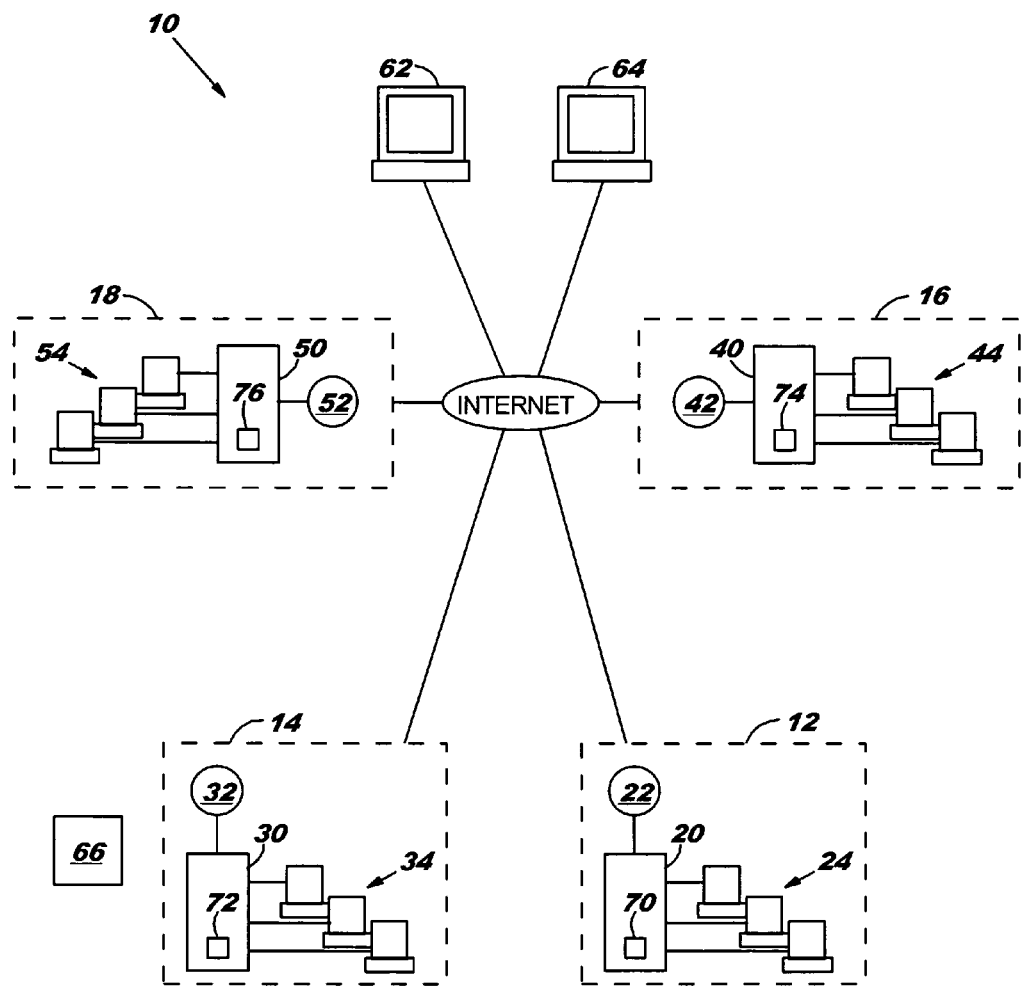
FIG. 1 is a block diagram of a distributed system in which the present invention may be practiced.

FIG. 1 shows a distributed system 10 generally comprising a group of server sites 12, 14, 16 and 18. Each site includes a server, a router and one or more memory devices. In particular, sire 12 includes server 20, router 22 and memory devices 24; and site 14 includes server 30, router 32 and memory devices 34. Similarly, site 16 includes server 40, router 42 and memory devices 44; and site 18 includes server 50, router 52 and memory devices 54.

All of the sites 12, 14, 16 and 18 are connected to the Internet, represented at 60. FIG. 1 also shows a plurality of users or clients 62 and 64, which are also connected to the Internet. These connections to the Internet may be made in any suitable manner.

Sites 12, 14, 16 and 18 are provided with variations of a basic application, referred to as instances, and as a practical matter, the instances may appear to users as one application. In FIG. 1, this basic application is represented at 66, and the four instances of the application are represented at 70, 72, 74 and 76.

Each of the instances has a database that is designed for use with users from a specific geographic region. For example, the database of the instance 72 on site 14 may be designed for users from Europe, the database of the instance 74 on site 16 may be designed for users from North and Central America, and the database of the instance 76 on site 18 may be designed for users from Asia.

Each site 12, 14, 16 and 18 has a unique Internet address and thus, each site has a unique URL (Uniform Resource Locator). Although all of the sites 12, 14, 16 and 18, and the instances running on those sites, are connected to the Internet and can be accessed via the Internet, users are, at least initially, informed of the URL for one of the sites or instances, referred to as the common instance. With the example given in FIG. 1, instance 70 is the common instance.

When a user wants to access the application 66, the user accesses the common instance 70, and that instance then determines the appropriate instance for the session with the user. Any suitable procedure may be used to make this determination; and for example, the user may be directed to the instance having the database for the geographic region in which the user is physically located.

Preferably, after the appropriate instance is determined, the common instance then sends back to the user, or more specifically, to the user's computer or workstation, the URL of the appropriate instance. The web browser on the user's computer or workstation then uses the received URL to establish a session with the selected, appropriate instance.

With the preferred embodiment of the invention, the application 66 is intended for a limited, restricted number of users, and the instances are provided with or utilize suitable access controls to achieve this. For example, the application may be designed to be accessed only by employees, or a limited number of employees, of a particular company. In this situation, when a user wants to initiate a session with the application, the user sends his or her name, or the name is otherwise sent, to the common instance 70.

Figure 2:
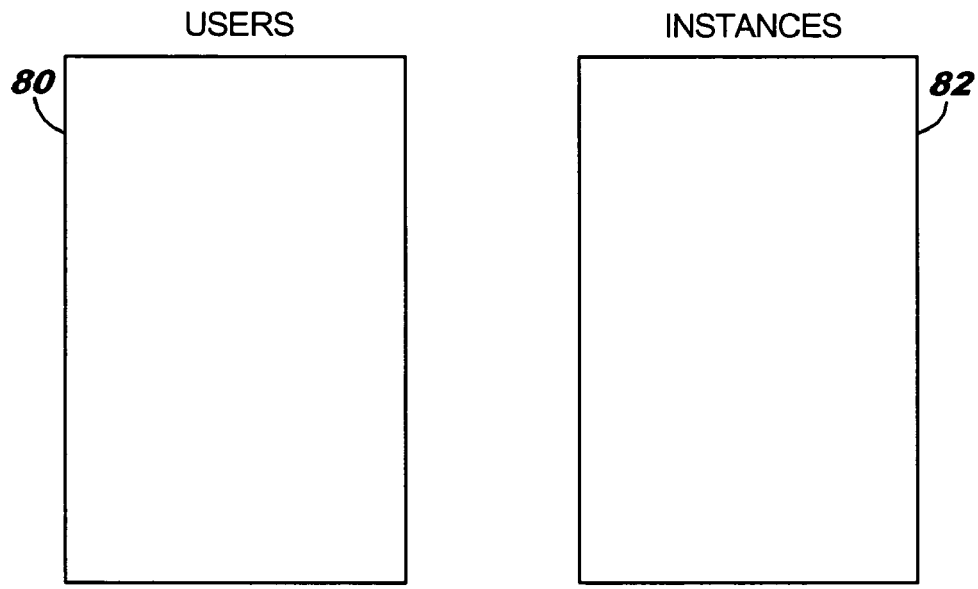
FIG. 2 shows a pair of tables that may be used in the practice of this invention.

With reference to FIG. 2, this instance 70 may be provided with a table 80 of the names of persons who are authorized to have access to the application, and that table may be checked to determine whether to initiate the session. This table, or another table 82, may also identify the appropriate one of the instances for the user's session.

As mentioned above, this determination may be based on the geographic location of the user, although other factors may be used in addition to or instead of that geographic location. Also, as will be understood by those of ordinary skill in the art, other procedures may be used to control access to application 66 and to determine the appropriate instance for the Web session with the user.

Figure 3:
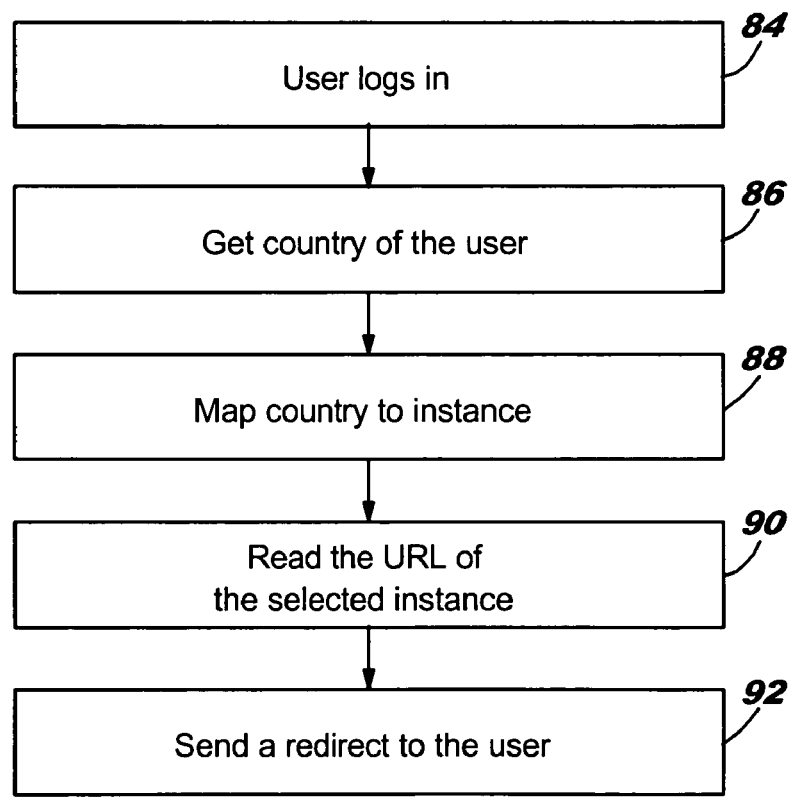
FIG. 3 is a flow chart showing a preferred procedure for implementing this invention.

FIG. 3 shows more specifically the steps of a preferred method for implementing the invention. With reference to FIGS. 2 and 3, in this preferred embodiment, user information is stored in a database 80, which also contains the country of the user. Another table 82 holds the configuration which specifies to which instance a user from a particular country goes to. The application 66 is built, for example, on a WebSphere platform, and so there are four application servers: one for the common instance, and three for the geographic specific instances.

The main URL of the application 66 maps to the common instance 70. So, when, at step 84, a user logs into the application 66, the request is sent to the connector code which then, at step 86, gets the country of the user from the employee information table 80 and then, at step 88, goes to the table 82 that maps countries to instances and gets the instance where the user should be routed off to. At step 90, the connector then reads the URL of the instance from a configurable property file and, at step 92, sends a redirect to the user with that URL.

This invention may be used in a wide range of specific applications. For example, the invention is very well suited for use with a corporate requisitioning system, where users access application to prepare requisition requests and to submit those requests for approval.

The preferred embodiment of the invention, as described above in detail, has a number of advantages. One important advantage is that it allows the application to do workload management and also to enforce security rules whereby, for example, a user in one instance cannot shop and order items in another instance. Further, the preferred embodiment of this invention allows the application to manage to which instance users from a particular country are routed to.

This is beneficial both from a performance and a security standpoint. For instance, users from Mexico may be on the Americas instance to start off with. But later, if this instance is getting overloaded, the invention provides the ability to change the configuration such that those users can now be routed to a different instance, and this change is transparent to the user.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A computer implemented method of establishing a session, via the Internet, between a user and an application, comprising the steps of:

providing a plurality of instances of the application on a plurality of servers, plurality of the instances of the application operating on the servers to perform a group of functions, each of the instances having a respective Internet address and a respective database, wherein the databases of the plurality of instances are different and have different information;

the user accessing one of the plurality of instances of the application, via the Internet, by means of the Internet address of said one of the instances of the application;

said accessed instance of the application operating for on one of the servers to perform the functions of selecting one of the plurality of instances of the application for a session with the user based on which one of the databases of the plurality of instances has the information that is best suited for the user according to a defined procedure;

said accessed instance of the application operating on one of the servers to perform the functions of sending to the user an identifier for establishing a session with said selected instance of the application; and the user establishing a session with the selected instance of the application, via the Internet, by using said identifier, wherein in said session, communications are sent back and forth between the user and the selected instance of the application;

wherein the step of selecting one of the plurality of instances of the application includes the step of selecting one of the plurality of instances of the application based on a profile of the user and based on given security rules; and wherein each of the instances has a respective Uniform Resource Locator, and the step of the accessed one instances sending to the user an identifier for establishing a session with the selected one instance includes the step of said accessed one instance sending to the user the Uniform Resource Locator of said selected one instance.

2. A computer implemented method according to claim 1, wherein the step of selecting one of the instances includes the step of selecting one of the instances based on the geographic location of the user.

3. A computer implemented method according to claim 1, wherein the accessed one instance includes a first table identifying, for each of a set of users, an associated geographic region, and a second table identifying, for each geographic region identified in the first table, an associated one of the instances, and wherein the step of selecting one of the instances includes the steps of the accessed one instance, obtaining from the first table, the geographic region associated with the user; and obtaining from the second table, the instance associated with the obtained geographic region.

4. A computer implemented method according to claim 1, wherein said user profile is configurable.

5. A system for establishing a session, via the Internet, between a user and an application, comprising:

a plurality of servers providing a plurality of instances of the application, the plurality of instances of the application operating on the servers to perform a group of functions, each of the instances having a respective Internet address and a respective database, and wherein the databases of the plurality of instances are different and have different information;

the user accessing one of said instances, via the Internet, by means of the Internet address of said one instance;

said accessed instance of the operating on one of the servers to perform the functions of:

i) in response to said accessed instances of the application being accessed, via the Internet by the user, selecting one of the instances of the application for a session with the user based on which one of the databases of the plurality of instances has the information that is best suited for the user according to a defined procedure, and ii) sending to the user an identifier for establishing a session with said selected one instance of the application, thereby to enable the user to establish a session with the selected one instance of the application, via the Internet, by using said identifier, wherein in said session, communications are sent back and forth between the user and the selected instance of the application;

wherein the selected one of the plurality of instances is selected based on a profile of the user and based on given security rules; and wherein each of the instances has a respective Uniform Resource Locator, and sends to the user an identifier for establishing a session with the selected one instance by sending to the user the Uniform Resource Locator of said selected one instance.

6. A system according to claim 5, wherein the means for selecting one of the instances includes means for selecting one of the instances based on the geographic location of the user.

7. A system according to claim 5, wherein:

the one of the instances further includes a first table identifying, for each of a set of users, an associated geographic region, and a second table identifying, for each geographic region identified in the first table, an associated one of the instances; and the means for selecting one of the instances includes i) means for obtaining from the first table, the geographic region associated with the user; and ii) means for obtaining from the second table, the instance associated with the obtained geographic region.

8. A system according to claim 5, wherein said user profiles are configurable.

9. A tangible memory device readable by computer, tangibly embodying a program of instructions executable by the computer to perform method steps for establishing a session, via the Internet, between a user and an application, said method steps comprising:

providing a plurality of instances of the application on a plurality of servers, the plurality of instances operating on the servers to perform a group of functions, each of the instances having a respective Internet address and a respective database, and wherein the databases of the plurality of instances are different and have different information;

the user accessing one of said instances, via the Internet, by means of the Internet address of said one instance;

said accessed one instance of the application operating on one of the servers to perform the functions of selecting one of the instances of the application for a session with the user based on which one of the databases of the plurality of instances has the information that is best suited for the user according to a defined procedure;

said accessed one instance of the application operating on one of the servers to perform the functions of sending to the user an identifier for establishing a session with said selected one instance; and the user establishing a session with the selected one instance, via the Internet, by using said identifier, wherein in said session, communications are sent back and forth between the user and the selected instance of the application;

wherein the step of selecting one of the instances includes the step of selecting of the instances based on a profile of the user and based on given security rules; and wherein each of the instances has a respective Uniform Resource Locator, and the step of the accessed one instances sending to the user an identifier for establishing a session with the selected one instance includes the step of said accessed one instance sending to the user the Uniform Resource Locator of said selected one instance.

10. A program storage device according to claim 9, wherein the step of selecting one of the instances includes the step of selecting one of the instances based on the geographic location of the user.

11. A program storage device according to claim 9, wherein the accessed one instance includes a first table identifying, for each of a set of users, an associated geographic region, and a second table identifying, for each geographic region identified in the first table, an associated one of the instances, and wherein the step of selecting one of the instances includes the steps of, the accessed one instance, obtaining from the first table, the geographic region associated with the user; and obtaining from the second table, the instance associated with the obtained geographic region.

12. A program storage device according to claim 9, wherein:

said user profiles are configurable.

* * * * *

UNITED STATES PATENT AND TRADEMARK OFFICE
CERTIFICATE OF CORRECTION

| | | |
|---|---|---|
| PATENT NO. | : 7,586,901 B2 | Page 1 of 1 |
| APPLICATION NO. | : 10/687717 | |
| DATED | : September 8, 2009 | |
| INVENTOR(S) | : Nitin Jhingan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1391 days.

Signed and Sealed this

Twenty-first Day of September, 2010

David J. Kappos
*Director of the United States Patent and Trademark Office*